United States Patent [19]

Lierz

[11] Patent Number: 4,740,119

[45] Date of Patent: Apr. 26, 1988

[54] LEVER OPERATED CONTROL MECHANISM FOR MOVEMENT OF AN ELECTRIC DRILL

[76] Inventor: Lawrence R. Lierz, 5059 Woodson, Mission, Kans. 66205

[21] Appl. No.: 72,594

[22] Filed: Jul. 13, 1987

[51] Int. Cl.⁴ .............................................. B23B 45/14

[52] U.S. Cl. ...................................... 408/111; 74/105; 74/520; 408/136; 408/712

[58] Field of Search ................................ 408/110-112, 408/136, 712, 115 R; 74/105, 106, 520; 409/178, 185

[56] References Cited

U.S. PATENT DOCUMENTS

| | | | |
|---|---|---|---|
| 1,272,108 | 7/1918 | Robb et al. | 408/136 |
| 1,493,142 | 12/1922 | Bodmer | 408/136 |
| 1,852,736 | 4/1932 | Connell | 408/136 |
| 1,927,006 | 9/1933 | Guibert et al. | 408/136 |
| 2,720,125 | 10/1955 | Palik | 408/136 |
| 2,810,308 | 10/1957 | Bodmer | 408/136 |
| 2,925,001 | 2/1960 | Johnson | 408/712 X |
| 2,973,673 | 3/1961 | Grau | 408/712 X |
| 3,038,422 | 10/1933 | Decker | 408/136 |
| 3,195,375 | 7/1965 | Guibert, Jr. et al. | 408/136 |
| 3,447,454 | 8/1967 | Ratz | 408/136 |
| 4,442,905 | 4/1984 | Agoston | 173/36 |
| 4,582,456 | 4/1986 | Imai | 408/136 |
| 4,585,376 | 4/1986 | Davenport, Sr. et al. | 408/110 |

*Primary Examiner*—Gil Weidenfeld
*Assistant Examiner*—Steven C. Bishop
*Attorney, Agent, or Firm*—Hovey, Williams, Timmons & Collins

[57] ABSTRACT

A dual, mirror-image lever and linkage assembly of a drill control mechanism advances the bit of the drill toward and away from a workpiece while retaining the bit at a true perpendicular orientation relative to the outer surface of the workpiece. Each linkage and lever assembly includes two levers which are arranged to provide a compound action and which are pivotally interconnected to a base by means of respective links which spread apart from each other as the levers are buckled to advance the bit toward the workpiece. The drill is releasably carried by a support that is fixed on each side to two guide pins that slide along a slot of a guide track which is secured to the base at a location between the two links. During advancement of the bit toward the workpiece, a handle region of one of the levers is moved toward the operator in order to provide enhanced perception of the rate of advancement of the bit which is particularly advantageous when drilling, for example, through safes.

12 Claims, 2 Drawing Sheets

LEVER OPERATED CONTROL MECHANISM FOR MOVEMENT OF AN ELECTRIC DRILL

BACKGROUND OF THE INVENTION

1. Field of the Invention

This invention broadly relates to a portable, lever operated mechanism for controlling the movement of an electric drill toward and away from a workpiece. More particularly, the present invention concerns an electric drill control mechanism having spaced apart mirror-image lever and linkage assemblies which each include a first lever pivotally coupled to a support carrying the drill, and a second lever pivotally connected to the first lever in such a fashion that swinging movement of a handle on the second lever causes the first lever to swing in an opposite direction and advance the support and the drill carried thereon toward the workpiece. The dual lever and linkage assemblies provide precise control over leveraged movement of the drill toward the workpiece while retaining the bit in an exact, perpendicular orientation relative to the surface of the workpiece as the drill is advanced or retracted along the full stroke length of the bit. The control mechanism is useful in such diverse applications as drilling into safes, installing anchors on walls for signs or constructing furniture.

2. Description of the Prior Art

Small, portable electric drills are used in a variety of applications and are especially convenient in circumstances where the workpiece is too large, heavy or bulky to be placed upon the table of a stationary, conventional drill press. However, it is difficult to hold the drill by hand in such an orientation that the longitudinal axis of the drill bit is held in a fixed position and exactly 90° from the plane of the work surface. When drilling relatively hard materials, the operator is often unable to apply for extended periods of time a steady force as may be necessary for advancement of the bit.

As an example, large signs which are secured to vertical walls of buildings are often held in place by means of expandable anchors or other devices that are received within holes drilled in the wall. Unfortunately, the drill may unintentionally wobble slightly from side to side such that the resulting hole includes non-cylindrical, flared portions and may be somewhat larger than is desirable for securely retaining the anchor in place. However, once the holes are drilled in the wall, little can be done to correct the problem without undertaking substantial, additional steps.

Moreover, signs or other items which are supported by two or more wall anchors are often not provided with adjustment devices for accommodating variations in distance between the installed anchors. As a result, if one of the holes or bores for the anchors is drilled in such a fashion that the longitudinal or central axis of the bore is disposed at an angle other than a true, 90° orientation from the plane of the wall surface, then lag screws or other devices which are typically received in the anchors project outwardly from the wall at an inclination which may correspondingly change the distance between adjacent lag screws from the intended dimension to such an extent that installation of the sign may be rendered difficult, if not impossible. In addition, the worker may be standing on a ladder, scaffold or other type of elevated platform in such a position that it is difficult to accurately assess the precise orientation of the drill bit relative to the wall.

As another example, it is desirable for locksmiths when drilling into safes to maintain the drill at all times at an exact, perpendicular orientation relative to the wall of the safe. These types of drilling operations are often only accomplished after a period of several hours due to the nature of the hardened material typically used in the fabrication of safes even though the wall of the safe may have a thickness of only one to two inches. As a consequence, maintenance of the drill bit at a precise, perpendicular orientation relative to the wall of the safe ensures that only a minimum of the hardened material need be removed by the bit.

More importantly, however, is the need for locksmiths to have precise control over advancement of the bit while being able to perceive or feel the speed of advancement of the drill bit when the latter reaches, for example, relatively soft materials. In many safes, the walls are comprised of an outer wall section of hardened steel and an inner, somewhat thinner wall section comprised of relatively softer steel. During the work operation, a hole is typically drilled directly over the lock mechanism so that tools may be inserted to manipulate and open the lock mechanism without destruction of the same. As a consequence, it is highly important that the user during advancement of the bit through the wall sections be able to perceive the relative ease of advancement of the bit when the latter reaches the softer, inner wall section so that the speed of advancement may be sufficiently reduced to avoid contact of the bit with the lock mechanism.

During the drilling of safes, excessive amounts of pressure need not be applied to the drill inasmuch as the drill may prematurely wear. However, steady amounts of pressure should be continuously applied to the drill in order to avoid undue lengthening of the period of time needed to complete the work operation. However, for the aforementioned reasons, the operator should at all times have a precise feeling for the rate of progression of the drill bit in order to instantly reduce pressure applied to the drill when necessary. As can be appreciated, it is sometimes difficult to accurately predict the respective thicknesses of the outer and inner wall sections of safes unless, of course, the locksmith has previously become intimately familiar with the perpendicular model and style of the safe being drilled.

In the past, it has been proposed to provide a lever or linkage arrangement in a relatively large, stationary drill press for shifting of a drill toward and away from a workpiece, in comparison to the rack and pinion mechanisms normally found on stationary drill presses. My attention has been called to the following patents: U.S. Pat. Nos. 1,272,108, 1,493,142, 1,852,736, 1,927,006, 2,038,422, 3,195,375 and 3,447,454. The lever mechanisms described and illustrated in these patents are not, however, dynamically arranged and balanced in such a fashion that the lever mechanisms may be used on significantly smaller, portable, hand-held rigs.

Certain of the aforementioned U.S. Patents, and in particular U.S. Pat. No. 3,447,454, describe lever and linkage assemblies which increase the mechanical advantage as a lower lever having a foot pedal is depressed to shift the drill downwardly into a workpiece. However, the two levers are interconnected by a link which is pivotally coupled to the second lever at a location that causes a reduction in a portion of the mechanical advantage gained by use of the first lever.

While the lever arrangement depicted in U.S. Pat. No. 3,447,454 may be satisfactory for increasing the force generated by the user sufficiently to longitudinally shift the drill bit into relatively dense materials, the particular arrangement and position of the link interconnecting the two layers undesirably decreases the control and feel over the drilling operation.

My attention has been also called to two other U.S. Patents, namely U.S. Pat. Nos. 2,720,125, 4,442,905 and 4,582,456 wherein are described drill rigs having handle levers that swing in directions generally opposite to the direction of advancement of the drill bit into a workpiece. Again, the lever mechanisms of these rigs cannot be satisfactorily adapted for use with small, portable hand held drill control mechanisms.

SUMMARY OF THE INVENTION

My present invention overcomes the disadvantages noted above by provision of a drill control mechanism having twin, mirror-image lever and linkage assemblies arranged in such a fashion to enable the drill to descend a distance equal to the entire length of the bit while retaining the latter at a precise perpendicular orientation relative to the surface of the workpiece. The levers of my control mechanism are arranged such that the drill shifts toward the workpiece as the handle is moved away from the same, offering a precise control and perception of progression of the work operation as well as eliminating the tendency of the drill bits to wobble from side to side and break as is often observed during use of conventional devices.

In more detail, the control mechanism of my present invention includes a base for contact with a workpiece, a pair of slotted guide tracks fixed to the base, and twin, substantially identical linkage and lever assemblies connected to the base on opposite sides of the drill. Each linkage and lever assembly includes a pair of links pivotally connected to the base and extending outwardly in opposite directions, along with levers which are each pivotally coupled to one of the links. A support for carrying the drill is connected on opposite sides to two pins which extend through one of the levers of each assembly and into the slot of the adjacent guide track, and the second lever is pivotally coupled to the first lever and includes an elongated handle portion which joins the assemblies for simultaneous operation.

During use of the control mechanism, the handle portion of the second lever is shifted through an arc which causes buckling of the two levers relative to each other and thereby swing the other lever in an opposite rotative direction. At the same time, both of the links swing away from each other to provide clearance for the levers and enable adjacent portions of the same to move toward positions closely adjacent the support. In this manner, the drill may be smoothly shifted toward the workpiece over a distance corresponding to the entire length of the exposed drill bit, and retracted an equal distance when desired.

The handle lever of the drill rig of the present invention, during descent of the drill bit into a workpiece, swings through a relatively wide arc even though the overall length of the handle lever is sufficiently small to allow comfortable operation and permit the worker to use the remaining hand for steadying the rig. The worker retains excellent control over movement of the bit and can precisely feel the progression or advancement of the bit into the workpiece such that the use of depth stops or other devices to limit the extent of movement of the drill bit is avoided. The rig may be comprised of relatively lightweight material such as aluminum so that the rig may be easily held by one hand against a wall for installing wall anchors as the other hand grasps the handle lever to control movement of the drill.

In accordance with a preferred embodiment of my invention, the base of the control mechanism includes a frame and at least one bolt threaded into the frame. Each bolt may thereby be adjusted as may be desired to orient the frame relative to the workpiece in situations where, for example, the workpiece has an uneven surface. Alternatively, the bolts may be used to position the base and thereby the drill bit at an inclination relative to the surface of the workpiece.

DETAILED DESCRIPTION OF THE DRAWINGS

Figure 7:
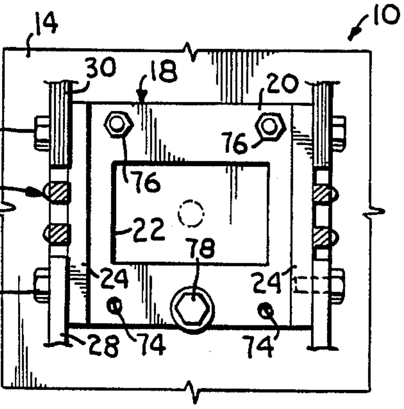
FIG. 7 is an enlarged, fragmentary side sectional view taken along line 7—7 of FIG. 1 showing the base and threaded openings formed for reception of adjustable legs.

A portable, lever operated control mechanism constructed in accordance with the principles of my present invention is illustrated in FIGS. 1-8 and is designated broadly by the numeral 10. The mechanism 10 controls the speed of advancement, the direction of advancement, and the applied force of an elongated drill bit 12 as the latter shifts in a longitudinal direction either toward or away from a workpiece 14, a portion of which is shown in FIGS. 1-4 and 7. The bit 12 is secured to the chuck of a conventional, portable electrical drill 16.

The control mechanism 10, in more detail, includes a base 18 that has a flat, rectangular frame 20 defining a central, rectangular aperture 22 that can best be appreciated by reference to FIG. 7. Two spaced, outwardly extending, parallel ribs 24 are fixed to opposite sides of one face of the frame 20, and optionally a suitable, somewhat resilient material may be mounted on the opposite face of the frame 24 for non-marring, frictional engagement with the workpiece 14.

Two subtantially identical, mirror-image lever and linkage assemblies 26, 26 are provided for controlling the movement of the electric drill 16 toward and away from the workpiece 14. In this regard, it is to be understood that the following description which identifies components of one of the assemblies 26 also describes similar components of the remaining assembly 26 that is disposed on the opposite side of drill 16.

Figure 1:
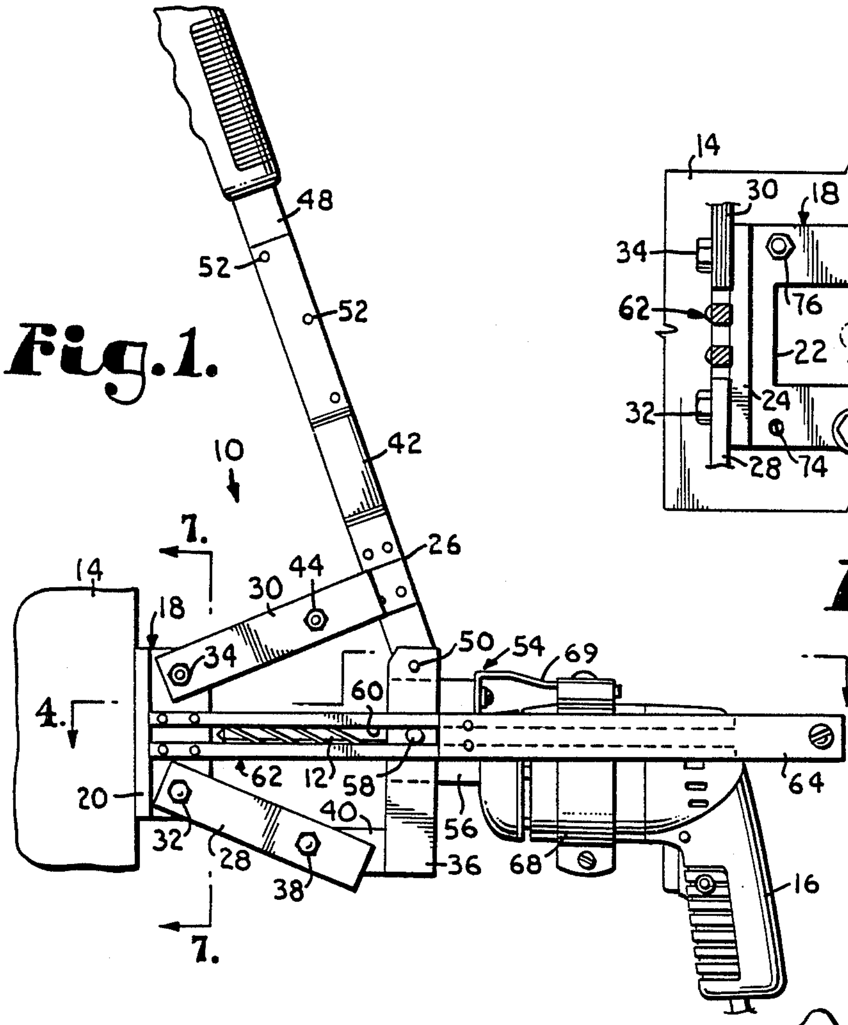
FIG. 1 is a side elevational view of a portable, lever operated control mechanism constructed in accordance with the principles of my present invention, showing a drill mounted on the mechanism and in a position ready to be advanced into a section of a workpiece.
Figure 2:
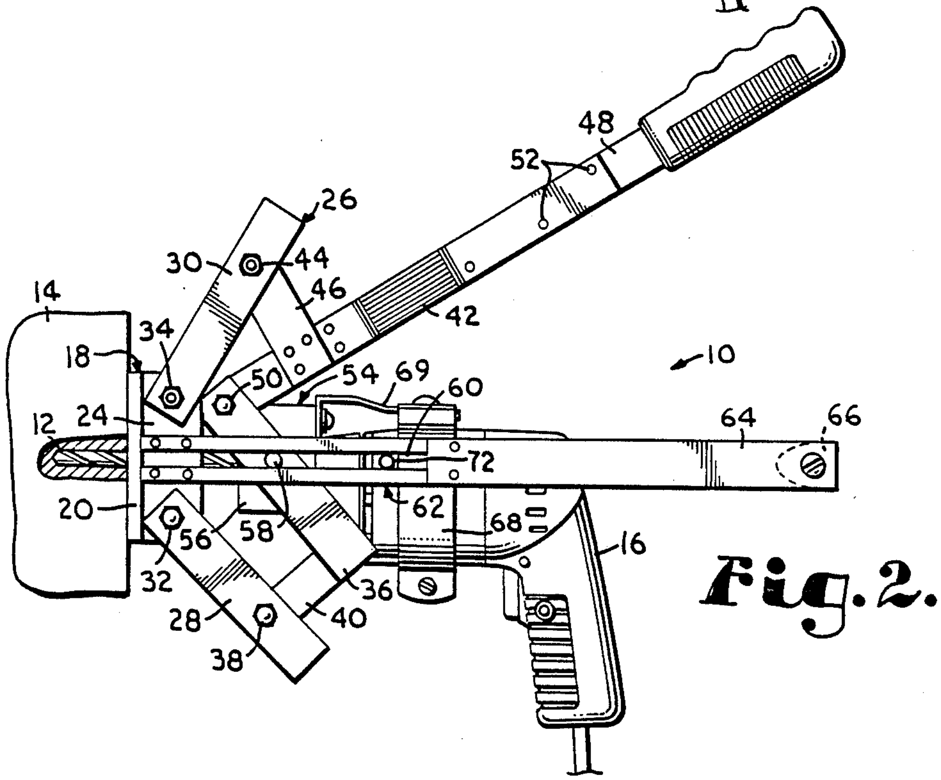
FIG. 2 is a view substantially similar to FIG. 1 except that a handle lever of the mechanism has been pivoted to advance a bit connected to the drill into the workpiece.

Referring now to FIGS. 1 and 2, each of the lever and linkage assemblies 26 includes a pair of links 28, 30 that are connected by means of pivots 32, 34 to spaced, opposite end sections of one of the ribs 24. Both of the links 28, 30 extend outwardly from the base 18 in directions away from each other.

A first lever 36 is connected to the link 28 by means of a pivot 38 which is located at a position remote from the base 18 and pivot 32. The lever 36 presents a generally L-shaped configuration and includes an arm 40 which is fixedly connected to the remaining, major extent of the lever 36.

A second lever 42 is connected to the link 30 by means of a pivot 44 disposed in a location remote from the base 18 and pivot 34. The second lever 42, as perhaps seen best in FIG. 2, has a generally T-shaped configuration having a major, elongated region and a fixed arm 46 extending transversely to the major region. The outwardmost end of the arm 46, which is disposed in intermediate region of second lever 42, is rotatably coupled to the pivot 44.

The second lever 42 further includes a handle region or handle 48, and an end region having a pivot 50 disposed remote from handle 48. In turn, the pivot 50 is also connected to the first lever 36, and more specifically is connected to a second end portion of the first lever 36 which is disposed at a location remote from a first end portion of the lever 36 which is connected to pivot 38.

Figure 3:
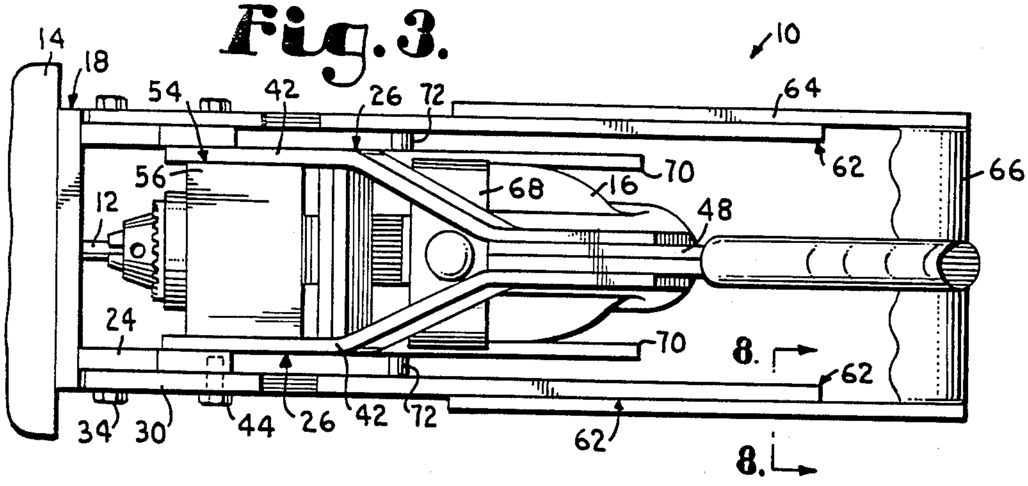
FIG. 3 is an enlarged plan view of the control mechanism illustrated in FIG. 2.

Referring to FIG. 3, the intermediate region of the second lever 42 of each lever and linkage assembly 26 is shaped to extend toward each other. Three screws 52, as shown in FIGS. 1 and 2, extend through the intermediate regions of both second levers 42 and also through the bar-like handles 48 of both levers 42 to fixedly join the two second levers 42 together for simultaneous movement. An outwardmost end section of each handle 48 is covered by a single, cushioned grip for simultaneous, manual manipulation of both of the lever and linkage assemblies 26.

A support 54, as shown in FIGS. 1–4, provides a means for carrying the electric drill 16 and includes a generally U-shaped block 56 (see also FIG. 6) through which extends a chuck of the drill 16. Two pins 58 are fixed to the block 56 and extend outwardly away from each other in a horizontal direction, transverse to the rotational axis of drill bit 12. Viewing FIGS. 1 and 2, an intermediate portion of each of the first levers 36 is pivotally coupled to a respective pin 58 at a location between the first end portion and the second end portion of the lever 36 and thereby between pivots 38 and 50.

Figure 4:
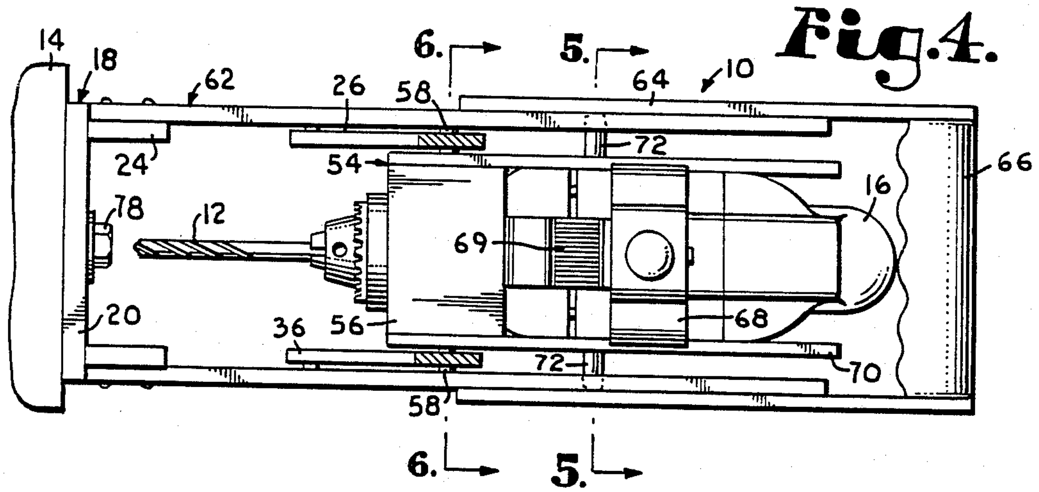
FIG. 4 is an enlarged, horizontal sectional view taken along line 4—4 of FIG. 1.
Figure 5:
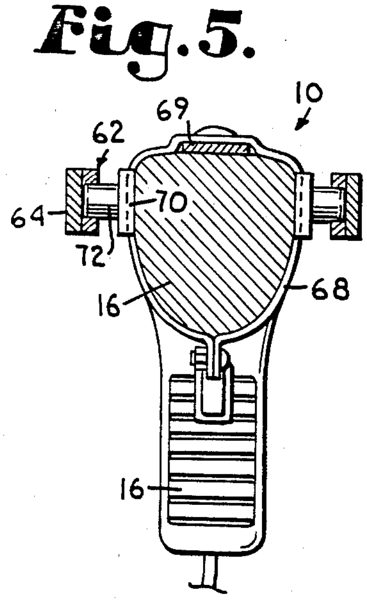
FIG. 5 is an enlarged, side crosssectional view taken along line 5—5 of FIG. 4, particularly illustrating a portion of the drill and two guide members or pins which are received within slots of a guide track.

Each of the pins 58 extends into a slot 60 (FIGS. 1 and 2) of a guide track 62 comprised of two spaced bars. Each of the guide tracks 62 is secured to a corresponding rib 24 of the base 18 and extends outwardly from the latter at a direction perpendicular to the outer face of frame 20. Outwardmost end regions of each guide track 62 are fixed to struts 64 that are interconnected by a grip 66, as shown in FIGS. 3 and 4.

The drill 16 is releasably secured to the block 56 by means of a metallic, generally U-shaped clamp 68 that is tightened by a bolt around the casing of drill 16. The clamp 68 is connected to a brace 69 (see FIGS. 1 and 2) that is fixed to block 56.

Figure 8:
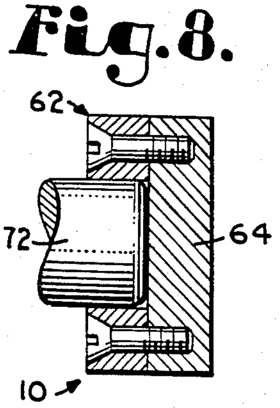
FIG. 8 is an enlarged, fragmentary side sectional view taken along line 8—8 of FIG. 3 to illustrate a connection between the guide track and a strut interconnecting the track and a handle grip for supporting the control mechanism, also depicting for illustrative purposes in phantom lines the configuration of the guide members or pins relative to a slot of the guide track.
Figure 6:
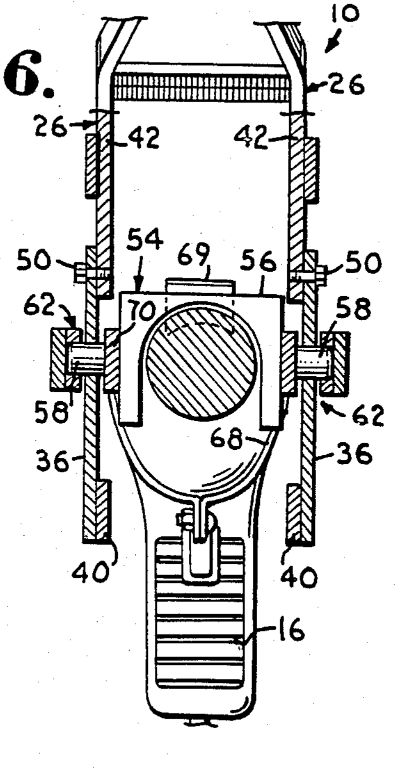
FIG. 6 is an enlarged, fragmentary, side sectional view taken along line 6—6 of FIG. 4, depicting a support for carrying the drill and another pair of guide pins which are received within respective slots of the guide track.

A pair of bars 70 are secured to opposite sides of block 56 and extend in generally parallel relationship to guide tracks 62. An upper end section of each bar 70 carries an outwardly extending guide pin 72 which is also received in the slot 60 in similar fashion to guide pins 58. FIG. 8, which depicts in detail the screws that connect the upper end of each guide track 62 to a respective strut 64, shows in phantom line for exemplary purposes only the reception of pin 72 within slot 60. As illustrated, the diameter of pin 72 (which is equal to the diameter of pins 58) is closely complemental to the width of slot 60 so that side to side movement of pins 58, 72 within slot 60 is generally precluded.

Finally, and referring to FIG. 7, the frame 20 of base 18 is provided with four threaded holes 74 which each receive a respective leg or bolt 76. The bolts 76 are threaded and are thus shiftably coupled to the base 18 for selective movement to any one of a number of positions in directions toward and away from the frame 20. In this manner, the base 18 may be placed in contact with a workpiece in inclined relationship to the latter. Alternatively, the bolts 76 may be advantageously used when irregularities, bumps or ridges of the workpiece surface prevent the base 18 from flatly contacting the same. Optionally, a belt 78 loosely extending through frame 20 may be used to secure base 18 to workpiece 14.

OPERATION

Once the drill 16 is actuated to rotate bit 12 and the control mechanism 10 is positioned so that the base 18 is in engagement with workpiece 14, the handle 48 is raised as indicated by the arrow in FIG. 1 in order to advance the bit 12 toward the workpiece 14. As the handle 48 moves in the direction of the arrow in FIG. 1, links 28, 30 simultaneously swing about respective pivots 32, 34 in opposite directions and away from each other, and thereby cause levers 36, 42 to swing about pivots 38, 44 respectively. At the same time, the levers 36, 42 swing in opposite directions about pivot 50, to thereby cause pins 58, 72 to slide along slot 60 and cause dirll support 54 to advance advance toward workpiece 14.

As the handle 48 continues to be swung in an arc, generally away from base 18, the respective longitudinal axes of the major extent of levers 36, 44 initially approach a position parallel to each other, and then continue to buckle about pivot 50 until reaching the orientation as is depicted in FIG. 2. Immediately before drill support 54 closely approaches base 18, however, the links 28, 30 first become stationary and then reverse their respective directions of swing, thereafter approaching each other until reaching the position depicted in FIG. 2.

Importantly, and as can be observed readily by reference to FIGS. 1 and 2, the pivots for both of the levers 36, 42 are arranged to provide a compound action which enhances the control over advancement of the bit 12 while facilitating a feel or feedback to the operator of the progression of advancement of bit 12. More particularly, it can be observed that pivot 50 moves through a smaller arc than does handle 48, and also the pivotal connection between the support 54 and first lever 36, or pin 58 moves through a smaller arc than does pivot 50. As a consequence, both of the levers 36, 42 are arranged to improve the mechanical advantage even though the overall size of the control mechanism 10 is small enough to fit within a relatively limited area.

Links 28, 30, in combination with respective arms 40, 46, further improve operation of the control mechanism 10 inasmuch as the links 28, 30 enable the levers 36, 42 to more closely approach the base 18 than would otherwise be possible. During advancement of the bit 12 toward the workpiece 14, the links 28, 30 spread away from each other which allows the pivotal connections 38, 44 to shift in a direction toward the workpiece 14 to smoothly bring drill support 54 toward base 18.

The four pins 58, 72, being received in respective slots 60, 60 ensure that the support 54 and the drill 16 coupled thereto move in a straight line in directions both toward and away from base 18. The dual lever and linkage assemblies 26, 26, disposed on opposite sides of the drill 16, balance forces throughout the control mechanism 10 so that a relatively smooth action is possible without imposition of lateral thrust.

When the mechanism 10 is used, for example, to drill through the walls of safes, the compound leverage provided by levers 36, 42 and links 28, 30 has been found to allow the worker to readily perceive the rate of advancement of the bit 12 through the safe even though a compound leverage action is provided. In this manner, the user can readily discern when the bit 12 has completed drilling through the relatively hard, outer wall section of the safe so that pressure on the handle 48 can be immediately reduced to slow advancement of the bit 12 through the softer, thinner inner wall section of the safe. However, the compound action provided by the control mechanism 10 enables the user to advance the bit 12 through hardened materials with relative ease and without undue force exerted on the handle 48 so that the operator consequently will not become readily tired even though the drilling operation may occur over a period of several hours in order to avoid destruction or undue wear on bit 12.

It has also been found, in accordance with the principles of the present invention, that the operator's feel or awareness of the progression of advancement of bit 12 is enhanced because the handle 48 is pulled toward the user, in contrast to prior art devices wherein a handle lever is pushed in the same direction as advancement of the bit when the latter approaches the workpiece. When pushing the handles of prior art devices toward the workpiece, the bits tend to wobble from side to side which can lead to undue wear on the bits and occasionally cause breakage of the latter. Moreover, side-to-side wobbling of drill bits increase the time necessary to complete the work operation due to the extra amount of material in the workpiece that is removed during such lateral movement.

The control mechanism 10 may advantageously be comprised substantially of relatively lightweight aluminum materials, and be of a size sufficiently small such that the user may hold the mechanism 10 against a wall surface merely by grasping handle grip 66 and exerting a force on the same toward the wall surface while pulling handle 48 in a direction away from the wall. The lever and linkage assemblies 26, 26 are arranged to fully advance the drill 16 a distance as great as the exposed length of drill bit 12, while maintaining at all times the drill bit 12 at a true, 90° orientation relative to the outer face of base frame 20.

When the drilling operation is expected to occur over an extended period, or when the materials being drilled are of a relatively hardened nature, a device such as a fastener 78 which is shown in FIGS. and 7 may be extended through a hole in the frame 20 and into the workpiece 14 for securing the base 18 to the workpiece 14. Alternatively, straps, chains or other structure may be used in order to retain the mechanism 10 in a stationary position during operation of lever and linkage assemblies 26, 26.

While the foregoing represents a detailed description of a currently preferred embodiment of my present invention, it is recognized that those skilled in the art may make various modifications or additions to the control mechanism 10 without departing from the gist and essence of my invention. As such, it is to be understood that the invention is deemed to be limited only by a fair scope of the claims which follow, along with their mechanical equivalents thereof.

I claim:

1. A control mechanism for movement of an electric drill having a bit toward and away from a workpiece comprising:

a base for contact with a workpiece;

a support for carrying the drill;

a first lever having a first end portion pivotally connected to said base, a second end portion remote from said first end portion, and an intermediate portion disposed between said first end portion and said second end portion and pivotally coupled to said drill support; and a second lever presenting a handle region, an end region remote from said handle region, and an intermediate region located between said handle region and said end region, said intermediate region of said second lever being pivotally connected to said base, said end region of said second lever being pivotally connected to said second end portion of said first lever, whereby swinging movement of said handle region of said second lever in a direction generally away from said base causes swinging movement of said first lever toward said base and in a rotative direction opposite to the rotative direction of swinging movement of said first lever for shifting said support and said drill carried thereby toward said workpiece.

2. The invention as set forth in claim 1; and including a pair of links each pivotally connecting a respective one of said first lever and said second lever to said base.

3. The invention as set forth in claim 2, wherein said first end portion of said first lever comprises a first arm extending in a direction generally transverse to said second end portion and said intermediate portion.

4. The invention as set forth in claim 2, wherein said intermediate region of said lever comprises a second arm extending in a direction generally transverse to said end region and said handle region.

5. The invention as set forth in claim 1, wherein said base includes a frame and at least one leg shiftably coupled to said frame for selective movement to any one of a number of positions in directions toward and away from said frame for enabling said base to be placed in contact with a workpiece in inclined relationship to the latter.

6. The invention as set forth in claim 1; including a guide track fixed to said base; and including a guide member secured to said drill support and shiftable along said base.

7. The invention as set forth in claim 6, wherein said guide member pivotally couples said first lever to said support.

8. Control mechanism for movement of an electric drill having an elongated bit rotatable about its longitudinal axis comprising:

a base for engagement with a workpiece;

a pair of links pivotally coupled to said base and extending outwardly from the latter in directions away from each other;

a first lever pivotally coupled to one of said pair of links at a position remote from said base;

a second lever pivotally connected to the other of said pair of links at a position remote from said base, said second lever being pivotally connected to said first lever at a location remote from said one link and including a handle portion remote from said first lever; and a support pivotally connected to said first lever at a position between said one link and said second lever for carrying the drill in an orientation such that said bit extends toward said base, said handle portion when moved in a direction generally away from said base causing swinging movement of said second lever in a certain rotative direction and causing corresponding swinging movement of said first lever in a rotative direction opposite to said certain rotative direction, thereby causing said support and the drill carried thereby to move toward said base.

9. The invention as set forth in claim 8; and including a guide track fixedly connected to said base; and a guide member coupled to one of said first lever, and second lever and said support, said guide member being shiftably coupled to said guide track for controlling the direction of movement of said support and thereby the drill.

10. The invention as set forth in claim 9, wherein said guide member is a pin fixed to said support and pivotally interconnects said support and said first lever.

11. The invention as set forth in claim 9, wherein said guide track is disposed between said pair of links.

12. The invention as set forth in claim 8, wherein said first lever and said second lever each present elongated portions and arms extending generally transversely away from respective elongated portions for pivotal connection with corresponding links.

* * * * *